(12) United States Patent
McCreesh et al.

(10) Patent No.: US 6,978,303 B1
(45) Date of Patent: Dec. 20, 2005

(54) MONITORING OF COMPUTER USAGE

(75) Inventors: Martin McCreesh, Dundalk (IE); Joseph Stockton, Dublin (IE)

(73) Assignee: Iontal Limited, Donegal (IE)

( * ) Notice: Subject to any disclaimer, the term of this patent is extended or adjusted under 35 U.S.C. 154(b) by 1061 days.

(21) Appl. No.: 09/696,177

(22) Filed: Oct. 26, 2000

(30) Foreign Application Priority Data

Oct. 26, 1999 (IE) ........................... 990893

(51) Int. Cl.[7] .......................................... G06F 15/173
(52) U.S. Cl. ................... 709/224; 709/250; 714/45; 714/48; 714/57; 719/321; 719/328; 718/106
(58) Field of Search ............................ 709/224, 250; 714/45, 48, 57; 719/328, 321; 718/106

(56) References Cited

U.S. PATENT DOCUMENTS

| | | | |
|---|---|---|---|
| 3,668,653 A * | 6/1972 | Fair et al. ..................... 700/1 |
| 3,906,454 A * | 9/1975 | Martin ......................... 714/45 |
| 4,590,550 A * | 5/1986 | Eilert et al. ................... 714/45 |
| 4,802,116 A * | 1/1989 | Ward et al. ................... 703/23 |
| 4,982,404 A * | 1/1991 | Hartman ...................... 714/55 |
| 5,148,548 A * | 9/1992 | Meche et al. ................ 455/514 |
| 5,226,117 A * | 7/1993 | Miklos ........................ 715/853 |
| 5,237,684 A * | 8/1993 | Record et al. ............... 719/318 |
| 5,416,726 A * | 5/1995 | Garcia-Duarte et al. .... 713/300 |
| 5,463,775 A * | 10/1995 | DeWitt et al. ............... 702/186 |
| 5,481,667 A * | 1/1996 | Bieniek et al. .............. 345/709 |
| 5,654,905 A * | 8/1997 | Mulholland et al. ........ 702/186 |
| 5,675,510 A * | 10/1997 | Coffey et al. ............... 709/224 |
| 5,675,752 A * | 10/1997 | Scott et al. .................. 715/866 |
| 5,713,027 A * | 1/1998 | Soejima et al. .............. 713/300 |
| 5,717,604 A * | 2/1998 | Wiggins ...................... 709/229 |
| 5,797,018 A * | 8/1998 | Tavallaei et al. ............. 710/200 |
| 5,802,555 A * | 9/1998 | Shigeeda ..................... 711/106 |
| 5,809,250 A * | 9/1998 | Kisor .......................... 709/227 |
| 5,835,765 A * | 11/1998 | Matsumoto ................. 718/102 |
| 5,862,335 A * | 1/1999 | Welch et al. ................ 709/224 |
| 5,874,960 A * | 2/1999 | Mairs et al. ................. 715/733 |
| 5,949,415 A * | 9/1999 | Lin et al. ..................... 715/740 |
| 5,949,975 A * | 9/1999 | Batty et al. .................. 709/213 |
| 5,951,700 A * | 9/1999 | Klein ........................... 714/47 |
| 5,983,351 A * | 11/1999 | Glogau ........................ 713/201 |
| 5,991,814 A * | 11/1999 | Rzonca et al. ............... 709/237 |
| 6,026,427 A * | 2/2000 | Nishihara et al. ............ 718/106 |
| 6,026,499 A * | 2/2000 | Shirakihara et al. .......... 714/11 |
| 6,046,740 A * | 4/2000 | LaRoche et al. ............ 715/764 |
| 6,065,138 A * | 5/2000 | Gould et al. .................. 714/47 |
| 6,112,237 A * | 8/2000 | Donaldson et al. ......... 709/224 |
| 6,158,044 A * | 12/2000 | Tibbetts ...................... 717/100 |
| 6,212,573 B1 * | 4/2001 | Lim et al. .................... 719/315 |

(Continued)

FOREIGN PATENT DOCUMENTS

EP 0652518 A1 * 5/1995 ........... G06F 11/34
EP 1096382 A2 * 5/2001 ........... G06F 11/34

*Primary Examiner*—Zarni Maung
*Assistant Examiner*—Backhean Tiv
(74) *Attorney, Agent, or Firm*—Jacobson Holman PLLC

(57) ABSTRACT

A utility operates on a networked PC and periodically executes a callback process to capture data to create discrete events. The callback process is periodically started, and it writes an event f either a frame period of 15 mins. has expired or the used application has changed, whichever is earlier. A protection program executes in parallel with a main program, both checking for a mutex of the other and re-starting the other if the mutex ceases to exist. Event data is automatically classified according to productivity classifications associated with applications.

14 Claims, 10 Drawing Sheets

U.S. PATENT DOCUMENTS

| | | | |
|---|---|---|---|
| 6,222,529 B1 * | 4/2001 | Ouatu-Lascar et al. | 715/745 |
| 6,240,452 B1 * | 5/2001 | Welch et al. | 709/224 |
| 6,279,124 B1 * | 8/2001 | Brouwer et al. | 714/38 |
| 6,282,701 B1 * | 8/2001 | Wygodny et al. | 717/125 |
| 6,308,208 B1 * | 10/2001 | Jung et al. | 709/224 |
| 6,351,777 B1 * | 2/2002 | Simonoff | 709/250 |
| 6,363,477 B1 * | 3/2002 | Fletcher et al. | 713/151 |
| 6,381,632 B1 * | 4/2002 | Lowell | 709/203 |
| 6,414,594 B1 * | 7/2002 | Guerlain | 340/506 |
| 6,438,592 B1 * | 8/2002 | Killian | 709/224 |
| 6,446,119 B1 * | 9/2002 | Olah et al. | 709/224 |
| 6,480,883 B1 * | 11/2002 | Tsutsumitake | 709/203 |
| 6,601,058 B2 * | 7/2003 | Forster et al. | 707/3 |
| 6,636,908 B1 * | 10/2003 | Winokur et al. | 710/29 |
| 6,654,036 B1 * | 11/2003 | Jones | 715/798 |
| 6,668,244 B1 * | 12/2003 | Rourke et al. | 704/275 |
| 6,678,824 B1 * | 1/2004 | Cannon et al. | 713/200 |
| 6,691,067 B1 * | 2/2004 | Ding et al. | 702/186 |
| 6,732,167 B1 * | 5/2004 | Swartz et al. | 709/223 |

* cited by examiner

MONITORING OF COMPUTER USAGE

INTRODUCTION

1. Field of the Invention

The invention relates to monitoring of usage of computers such as networked PCs.

2. Prior Art Discussion

It is known to provide programs to perform such monitoring. For example, U.S. Patent Specification No. 5675510 (PC Meter L.P.) describes a system in which window titles are used to determine usage and to make entries to a log file. However, there is still a need for a system to capture more information for use in generation of comprehensive reports such as reports for corporate organisations having many employees using computers. There is also a need for improved security in operation of monitoring programs to improve integrity of reported data.

SUMMARY OF THE INVENTION

According to the invention there is provided a computer usage monitoring utility comprising means for operating as a background application transparently to a user to capture usage data indicating usage of the computer, wherein the utility comprises means for automatically determining a productivity classification for each used application identified in the usage data.

In one embodiment, the utility comprises means for recording an event for each application used by a user and for applying a productivity classification for each event.

In one embodiment, the utility accesses a classification table in which a productivity classification is allocated to application groups, to applications, and to window text keywords.

In one embodiment, the utility comprises means for attempting to classify productivity in sequence according to application group, application, and keywords.

In one embodiment, the utility comprises means for checking for an active window at periodic callback intervals, and for marking an idle indicator if user activity is below a threshold.

In one embodiment, the utility comprises means for generating an event record at a callback interval when either a frame time period expires or when an active application changes, whichever is earlier.

In one embodiment, the utility comprises means for determining usage data according to a captured number of actions of user input devices such as a keyboard and a mouse.

In one embodiment, the utility comprises means for incrementing an idle count at periodic intervals if an input device is inactive and for marking a window as idle when the count reaches a threshold.

In another embodiment, the utility comprises means for maintaining a temporary list of applications associated with windows previously identified, for retrieving an application name for a window if the window is present in the list, and for interrogating the operating system to determine the application name if the window is not in the list.

In one embodiment, the utility comprises means for searching in an operating system for an opened process with a name indicating that it is an executable associated with a window.

In one embodiment, the utility comprises means for capturing an active URL if the active application is a browser.

In one embodiment, the utility comprises an authorised stop program for closing the utility for purposes such as upgrade.

In one embodiment, the stop program comprises means for creating a stop mutex, and the utility comprises means for closing down in an orderly manner if the mutex is opened.

In one embodiment, the utility comprises a listener thread for listening for a mutex at periodic intervals.

In one embodiment, the utility comprises a protection program comprising means for executing in parallel to a main program implementing monitoring functions, both the main program and the protection program comprising means for determining if the other has stopped executing, and for re-starting it if it has stopped executing.

In a further embodiment, both the main program and the protection program open a mutex and comprise means for detecting existence of the mutex of the other to determine if the other is executing.

In one embodiment, the utility comprises a second protection program comprising means for re-activating the main program or the first protection program if either stops operating and for terminating itself when it has finished execution.

In one embodiment, the main program comprises means for writing an alert to a log file if a protection program is terminated.

In one embodiment, the utility comprises a live transfer mechanism for automatic transfer of event records to a server in real time.

In one embodiment, the utility further comprises a triggered event mechanism comprising means for triggering an alert message if alert usage conditions are met.

In one embodiment, an alert condition is set according to a user profile.

According to another embodiment, the invention provides a computer usage monitoring utility comprising means for operating as a background application transparently to a user to capture usage data indicating usage of the computer, wherein:

the utility comprises means for recording usage data in discrete events, in which there is an event at expiry of a periodic frame interval or when a used application changes, whichever is earlier, and the utility comprises means for activating a callback process at periodic intervals to check for either of said two conditions exist, and the utility comprises means for automatically determining a productivity classification for each event.

DETAILED DESCRIPTION OF THE INVENTION

BRIEF DESCRIPTION OF THE DRAWINGS

The invention will be more clearly understood from the following description of some embodiments thereof, given by way of example only with reference to the accompanying drawings in which:—

DESCRIPTION OF THE EMBODIMENTS

Figure 1:
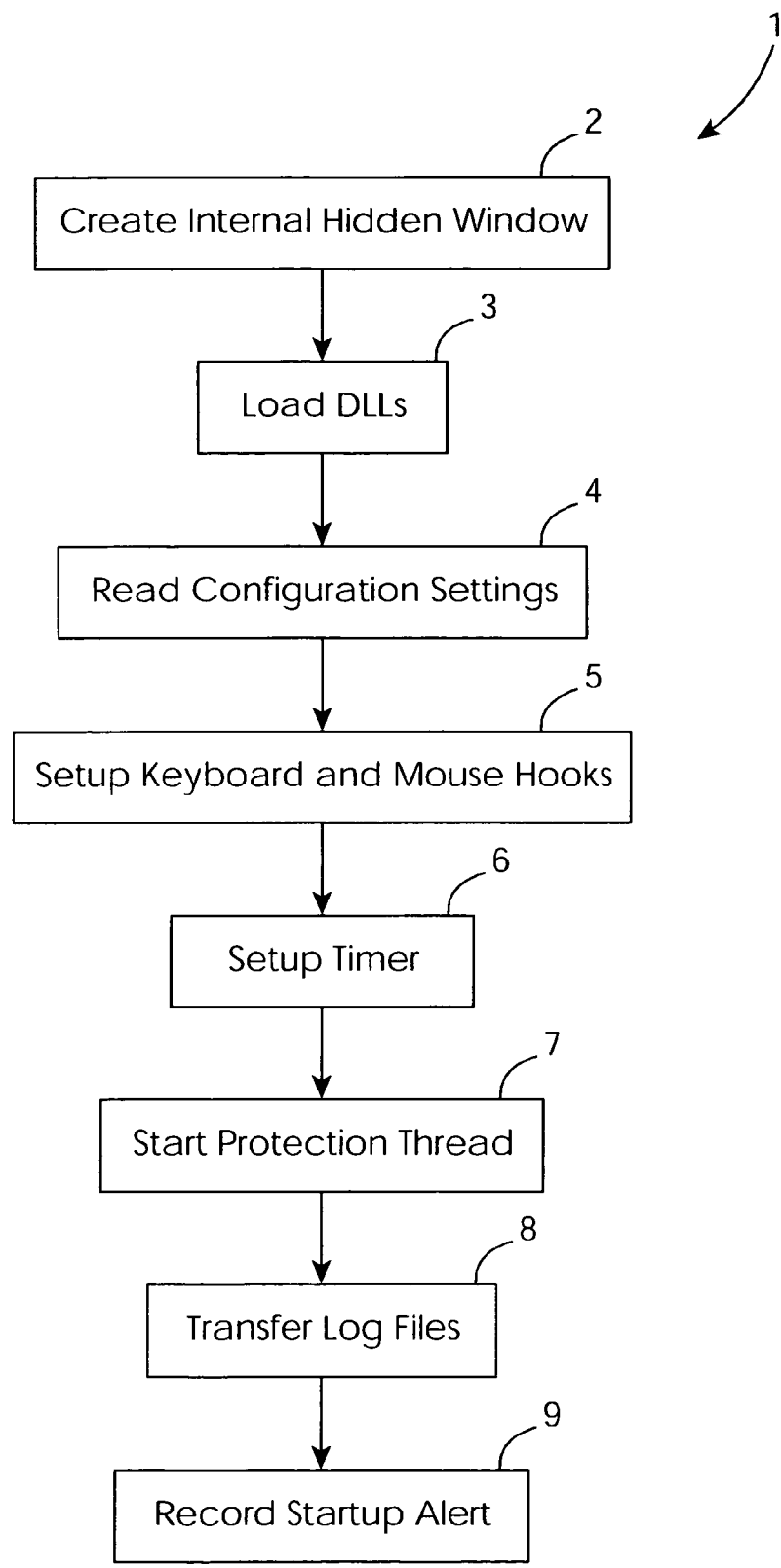
FIG. 1 is a flow diagram illustrating operation of an initialisation routine for a data collection utility of the invention.

Referring to FIG. 1 an initialisation process 1 for a data collection utility of the invention is illustrated. The utility operates as a background process in a user's PC in a transparent manner with minimal effect on applications running on the computer.

An internal hidden window is created in step 2 and Dynamic Linked Libraries (DLLs) are loaded in step 3 for operation of the utility. In step 4, the utility reads configuration settings from the system registry and in step 5 it sets up keyboard and mouse hooks. A "snap-shot" timer is set up in memory in step 6. A protection thread is started in step 7. This is an independent thread which checks every second for the existence of a stop mutex and for the existence of a protection mutex, described in detail below. Any outstanding log files are transferred in step 8, and a start-up alert to indicate the time of starting is recorded in step 9.

Figure 2:
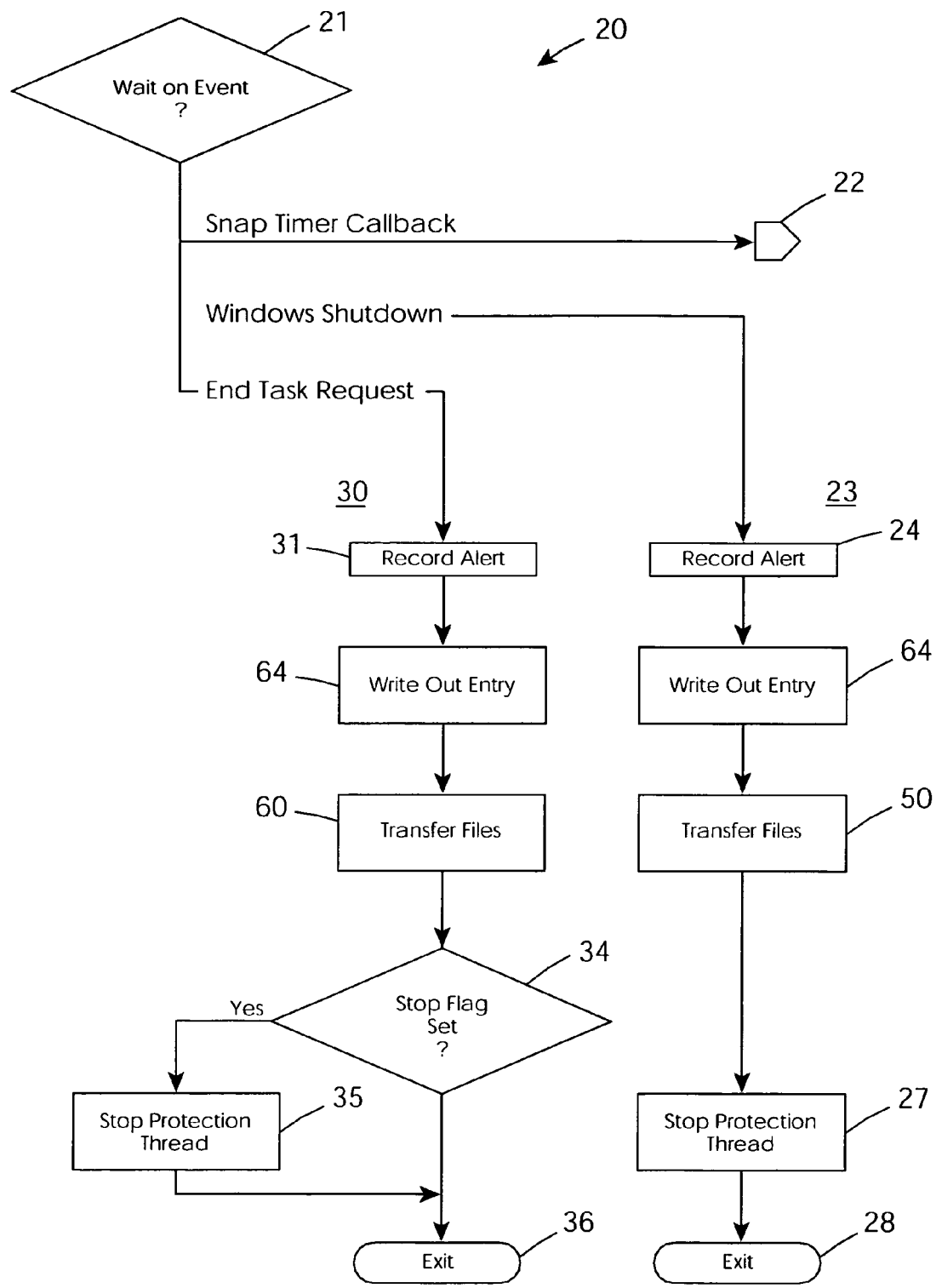
FIGS. 2 to 8 are flow diagrams illustrating operation of the utility.

A main event process 20 is illustrated in FIG. 2, and as indicated by a decision step 21 the three possible events are snap shot timer callback 22, operating system shutdown 23, and end task request 30. A snap-shot timer callback process 22 is activated for the main operation of the utility. This is described in detail below. The main event process 20 also includes an operating system (Windows™ in this embodiment) shut-down process 23. This comprises recording an alert with the shut-down time in step 24, and in a "write out last entry" process 64 it writes out an entry to save records in memory to a disk file. Operating system shut-down also results in the utility attempting to transfer any files to a server in step 50. The protection thread is stopped in step 27 and the utility exits in step 28. The end task request process 30 arises upon an attempt to stop operation of the utility. An alert is recorded in step 31, memory records are saved to file in step 64, and a file transfer attempt is made in step 50. According to a decision step 34, if a stop flag is set (indicating authorised closing of the utility) the protection thread is stopped in step 35. If not, the utility exits in step 36.

Figure 3:
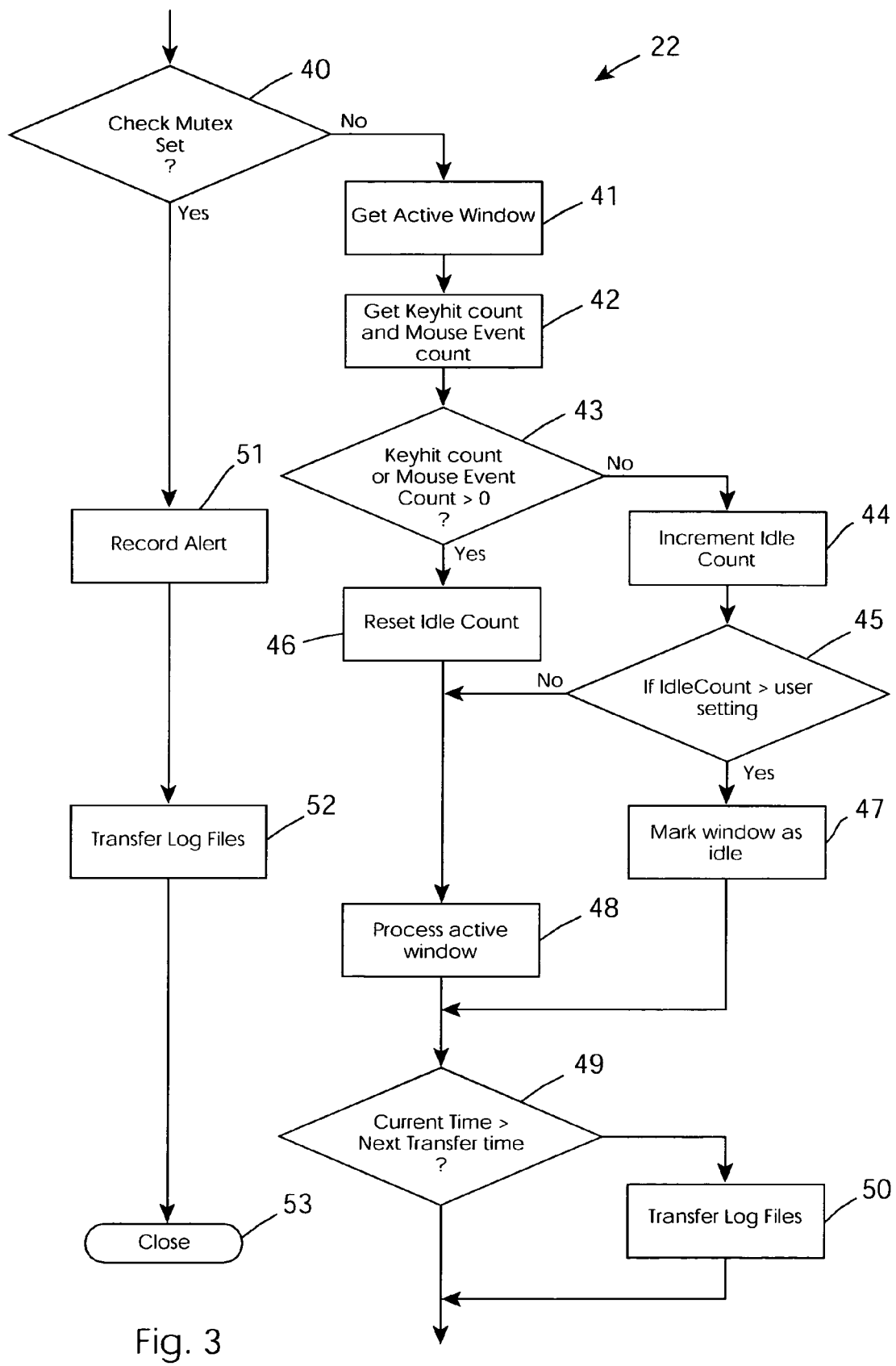

A primary operation of the utility is the callback process 22, described in detail now with reference to FIG. 3. This process is started at periodic intervals which are configurable. A typical interval is 5 secs. In step 40 the protection thread checks if the stop mutex has been set by the closing program of the utility. The stop mutex is used to allow an authorised user or process to terminate the utility for upgrading or other authorised reason. If this is set, the utility records an alert to the effect that is has closed and the alert includes details of the user or process which used the stop mutex. The log files are transferred in step 50 and the utility is closed in step 53.

The protection thread also checks every second for the protection mutex, as described in detail below.

If the stop mutex has not been set, in step 41 the utility gets the active window, and in step 42 it gets the key-hit and mouse event counts using the hooks which were set up at initialisation. This is achieved by using the function "SetWindowsHookEx" in Windows™ to hook all keyboard and mouse activity. A counter is incremented with every keystroke and every mouse action.

As indicated by a decision step 43, if there has not been any keyboard or mouse activity an idle count is incremented in step 44 and is then checked in step 45 against a user setting. If the count exceeds the user setting the window is marked as idle in step 47. If there has been mouse or keyboard activity the idle count is reset in step 46.

An "active window" process 48 is then executed. As indicated by the decision step 49 when the next file transfer time is reached the "file transfer" process 50 is implemented. Thus, the utility effectively records both user activity in relation to applications, and also when the system is idle in the form of "idle events".

Figure 4:
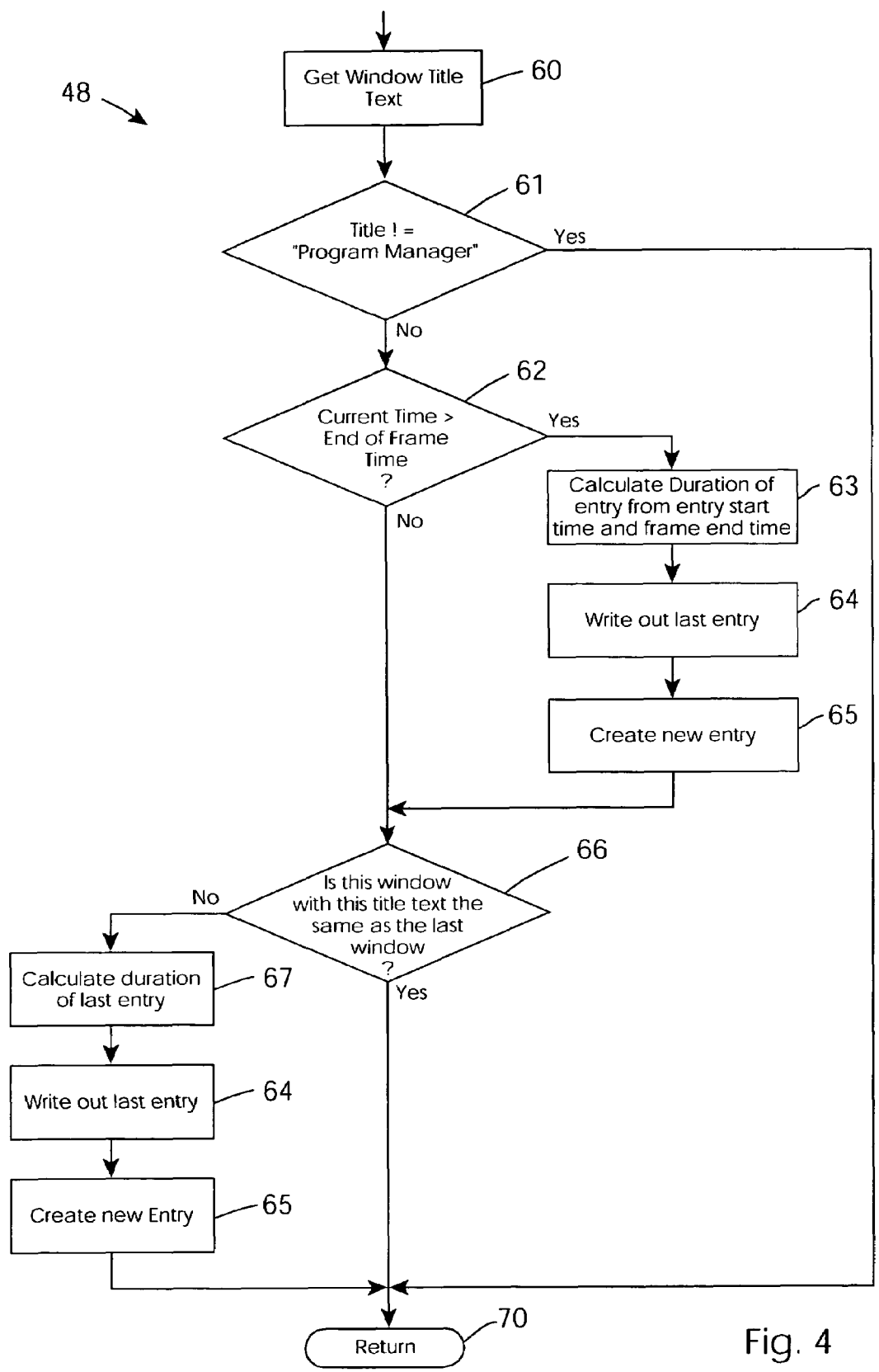

Referring now to FIG. 4 the "active window" process 48 is described. This process ensures that there is an event either (a) when a frame time of 15 minutes expires, or (b) when an application is changed, whichever is earlier. Thus, there is an event at least every frame period and this allows event database reporting programs to use timelines synchronised with the frames.

In step 60 the utility captures the window title text to provide an indication of what the user is doing. In step 61 it checks if the title is a general shell title such as "Program Manager", which can be ignored. The current record in memory is saved to disk at the end of every frame. The new record which is created has the same information as the previous record but a duration field set to zero. The utility monitors real time for expiration of the current frame period as indicated in step 62. If it has expired, in step 63 the utility determines if the current entry occurred in the previous or the new frame and it executes the "write out last entry" process 64 followed by the "create new entry" process 65. The utility determines if the current window is the same as the last window in step 66, and if so it returns to the call-back routine 22 in step 70. If not, in step 67 it calculates the duration of the last entry using the following counters:

a foreground counter of the time the window has been receiving keyboard or mouse user inputs, a key-hit counter, and a mouse event counter.

The "write out last entry" process 64 and the "create new entry" process 65 are then implemented. In this way there is a last entry write-out at either a frame time-out or a new application being used, whichever is earlier.

Figure 5:
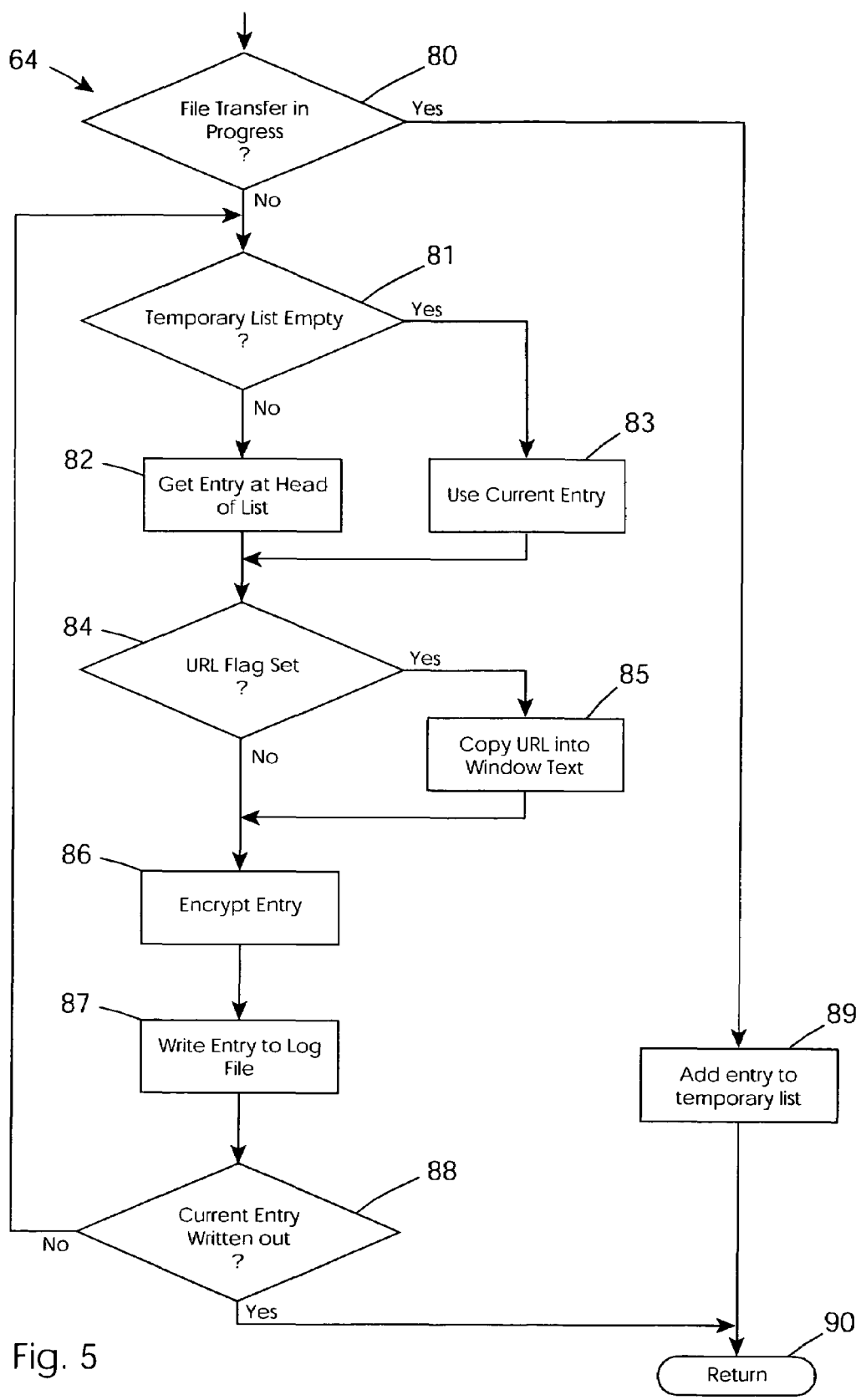

Referring to FIG. 5, the "write out last entry" process 64 is now described. As indicated by step 80 the utility determines if a file transfer is in progress, and if so it adds the entry to a temporary list in step 89. If not, in step 81 it checks if the temporary list is empty. If not empty, in step 82 it gets the entry at the head of the list and if empty it uses the current entry. In step 84, it checks if a URL flag has been set, indicating that a browser is the active application. If so, it appends the URL to the window text in memory.

The entry is encrypted in step 86 and the entry is written to the log file in step 87. The encrypted data is binary with checksums. As indicated by the decision step 88 steps 81 to 87 are repeated until all the entries are written out.

Figure 6:
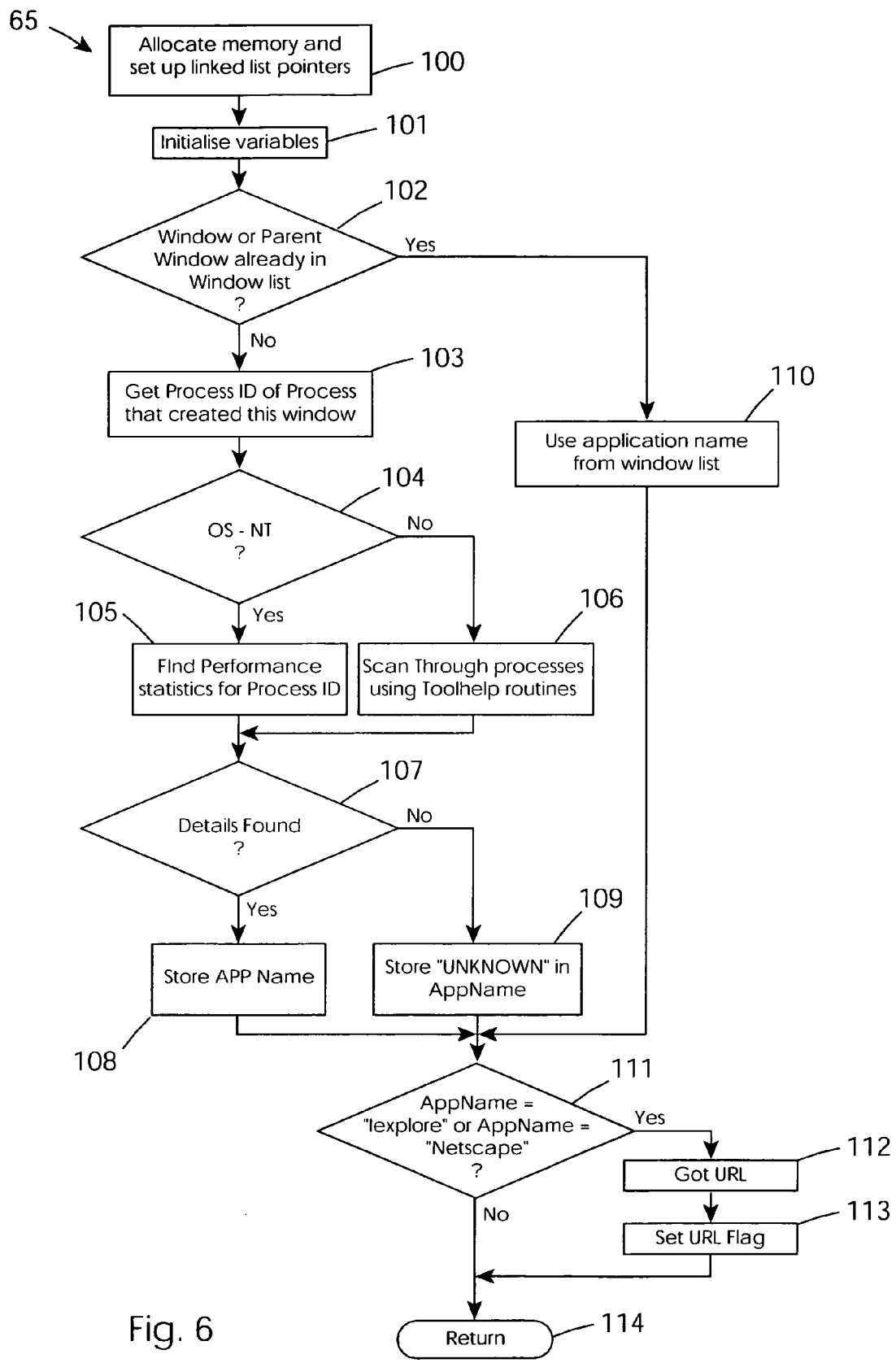

The process 65 for creating a new entry is illustrated in FIG. 6. Memory is allocated in step 100 and variables are initialised in step 101. The variables are username, computer name, current time, and window title. A window list is maintained and if the current window is already in the list (step 102) the application name is retrieved from the window list in step 110. This list minimises the number of searches that have to be conducted. Thus, placing of a window in the background or minimising it will not result in a new process tree search when that window becomes active again. If not in the list, in step 103 the utility gets the ID of the application. If the OS is NT™ (Step 104) the utility simple finds the performance statistics for the ID in step 105. If not N™, the utility scans through the applications using Toolhelp routines in step 106. This involves taking a snapshot of all running processes and scanning through each one that has a ".exe", a ".scr" extension, or any other executable file name extensions for the one with a process ID that matches the process ID associated with the current window handle. As indicated by the steps 107 and 109 the value "UNKNOWN" is written if the application details are not found, and they are written in step 108 if they are found. The utility determines if the application is an Internet browser in step 111, and if so it gets the URL in step 12 and sets a URL flag in step 113. Flow returns to the main process in step 114. Each record (entry) includes the computer name, the username, the current time (start time of event), frame start time, time of window snap shot, additional information such as window text, application name, event duration, number of key strokes, the number of mouse events, and, if applicable, the URL.

Figure 7:
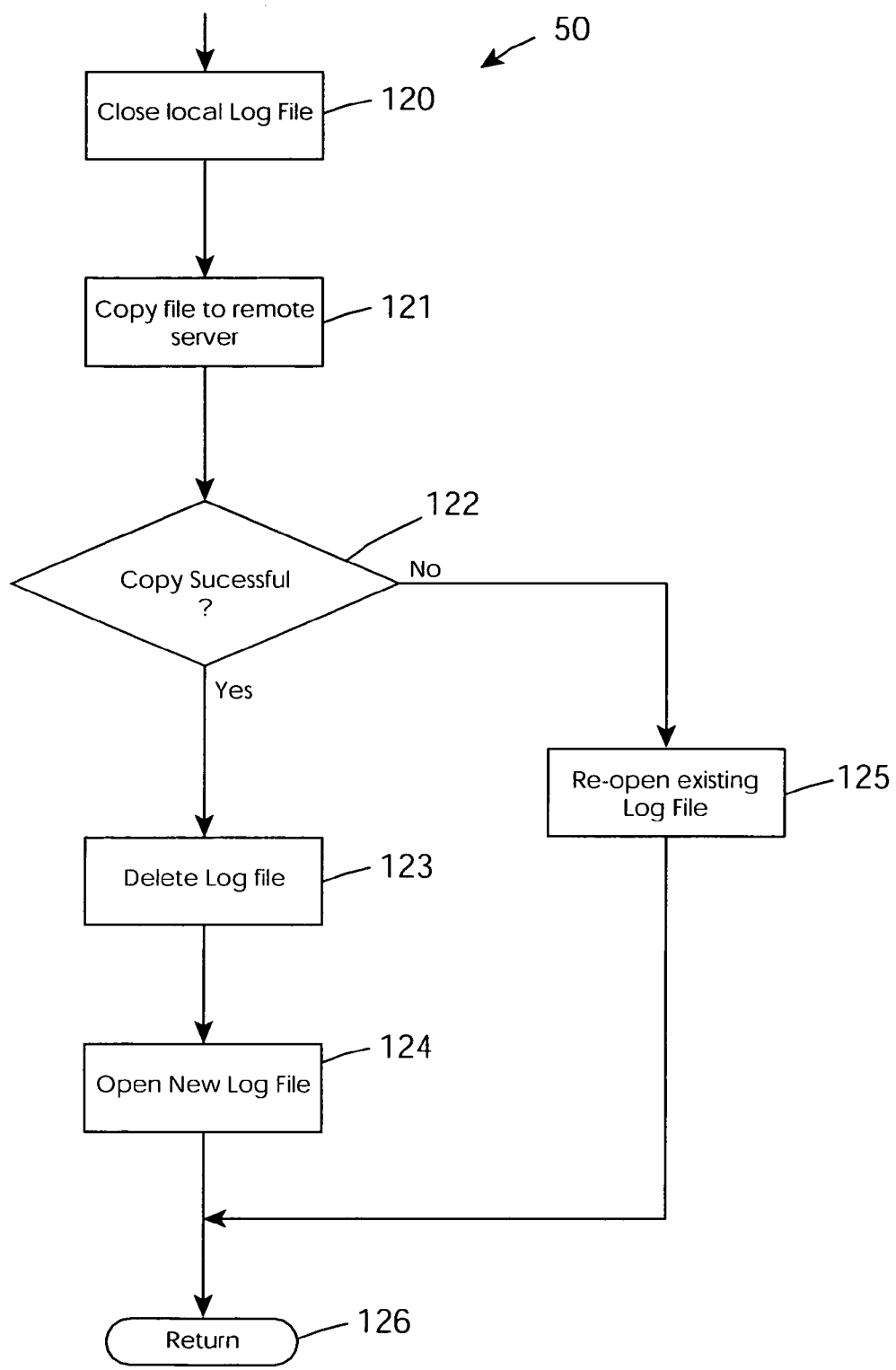

Referring to FIG. 7 the "transfer log file" process 50 is described. In step 120 the local log file is closed and it is copied to the remote server in step 121 according to the configured directory path. The log file is re-opened in step 125 if the copy is not successful as indicated by step 122. If successful, the log file is deleted in step 123 and a new log file is opened in step 124. Return to the main program is indicated by step 126.

Figure 8:
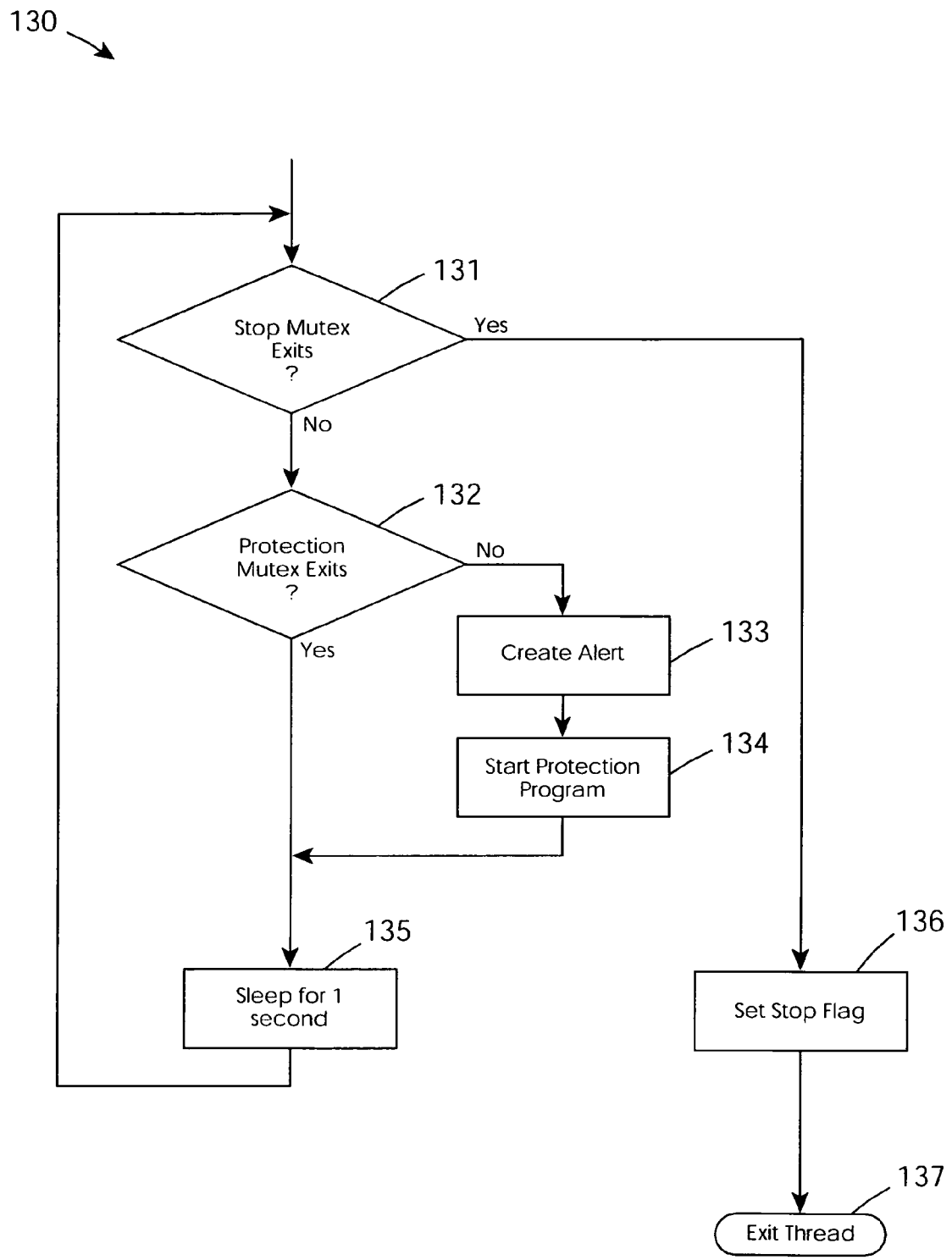

Referring to FIG. 8, the utility has a background protection thread which checks for the stop mutex and the protection mutex. As indicated by the decision step 131, if the stop mutex exists a stop flag is set in step 136 and the thread is stopped in an orderly manner in step 137 by the stop program of the utility. The thread also checks (step 132) for the protection mutex. If this does not exist an alert is created in step 133 and a protection program is started in step 134. The utility then "sleeps" for 1 second before return to step 131, i.e. the thread checks for each mutex every second.

In more detail, the stop mutex is opened by a stop program of the utility which allows authorized and orderly closing of the utility for purposes such as upgrade. This program is password-protected.

The protection mutex is opened by a protection program of the utility and should always exist. The main program of the utility ("DCUApp") and the protection program ("DCU-Prot") each have a thread checking the protection mutex of the other. The protection program is open, but not performing any processing activity. If the mutex of the main program is absent, it automatically re-starts the main program. If the mutex of the protection program is absent, the main program automatically re-starts the protection program. There is thus parallel protection because absence of either mutex is an indication of an unauthorized attempt to close the utility. The protection program has either standard protection or extended protection functions, as set out below.

Figure 9:
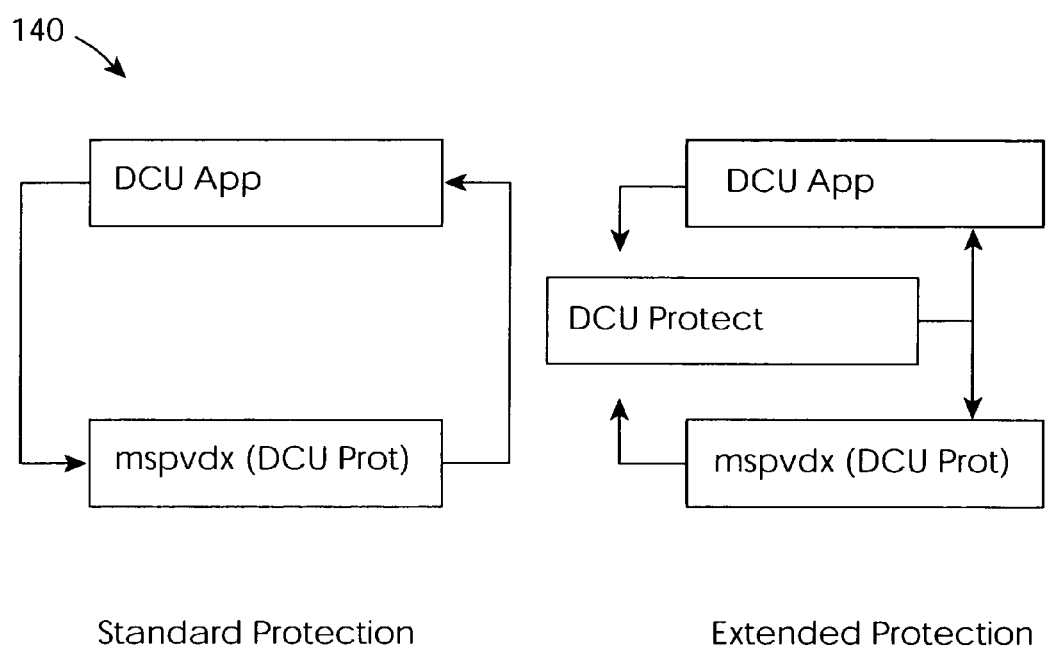
FIG. 9 is a diagram illustrating protection of the utility.

Standard Protection (FIG. 9)

Should a user attempt to stop the utility using the task manager the other program running in parallel detects that the mutex is missing and restarts the relevant program. Should the user attempt to terminate the second program, then the original utility detects that it has been removed, and restarts this second program.

Therefore, the only way for a user to terminate the utility is to be able to terminate both programs at the same time, which is not possible using Windows 9x operating systems. Additionally, The second utility has a generic filename so as to be inconspicuous within the task manager.

Extended Protection.

When a utility starts a second utility, the Microsoft Windows™ operating system sets a 'process tree' from one application to the other. In Windows NT/2000™ operating systems, a user can specify to terminate a process and its process tree. This allows illegal termination of the utility by process tree termination on Windows NT or 2000™ operating systems. With extended protection, each utility calls a third, transitory application which executes the terminated utility. This third utility terminates as soon as it has finished its execution, therefore releasing the process tree from the two parallel applications. Extended protection makes it impossible to terminate illegally using Microsoft 9x, N™ or Windows 2000™ operating systems.

FIG. 9 illustrates the protection mechanisms diagramatically, in which the utility is referred to as a Data Collection Utility Application (DCUApp).

Alert Log Mechanism.

As well as storing application data to the log files the utility stores alerts which include details such as USER LOGIN and SHUTDOWN. Importantly, alerts are used to log attempts to stop the utility.

Since the application is started by a registry setting the user may attempt to change this. This will mean that no records will be recorded for that user, hence alerting the manager to a problem. Additionally since the product is a data monitor any attempt to tamper with the registry settings will be seen in the logfiles providing that the snapshot interval is not increased above a reasonable level.

The utility includes a data upload program which runs either as a Windows NT™ service or as a stand alone program. It must be located on the computer which has the log database. After a user-configurable time-frame, the log files within the central server directory are interpreted by the data upload utility. The data upload program performs the following:

NT Service Uploading,
Standard Executable Uploading,
TCP/IP Uploading,
Log entry error detection. Each entry within a log file is marked as uploaded if it is successfully added to the central database store. If no errors occur during the uploading of a log file, the log file is deleted once all entries have been uploaded. If errors occur on entering an entry into the database, this entry is written to a separate error file and the next log entry is added to the database, and
Log file deletion. Once all records of a log file are successfully imported into the database, the log file is deleted.

During upload and generation of new log entries within the database, a number of further classifications are made.

Group Identification and Allocation.

Each entry of the log file contains a user, computer, application and window title which needs to be entered into the server database. If a log file entry contains a new user, computer, or application, a corresponding entry is placed within the appropriate area of the database. If the log file contains existing information, only the reference to the existing information is required to be stored within the database. This allows for a highly optimised database system.

Productivity Allocation.

Figure 10:
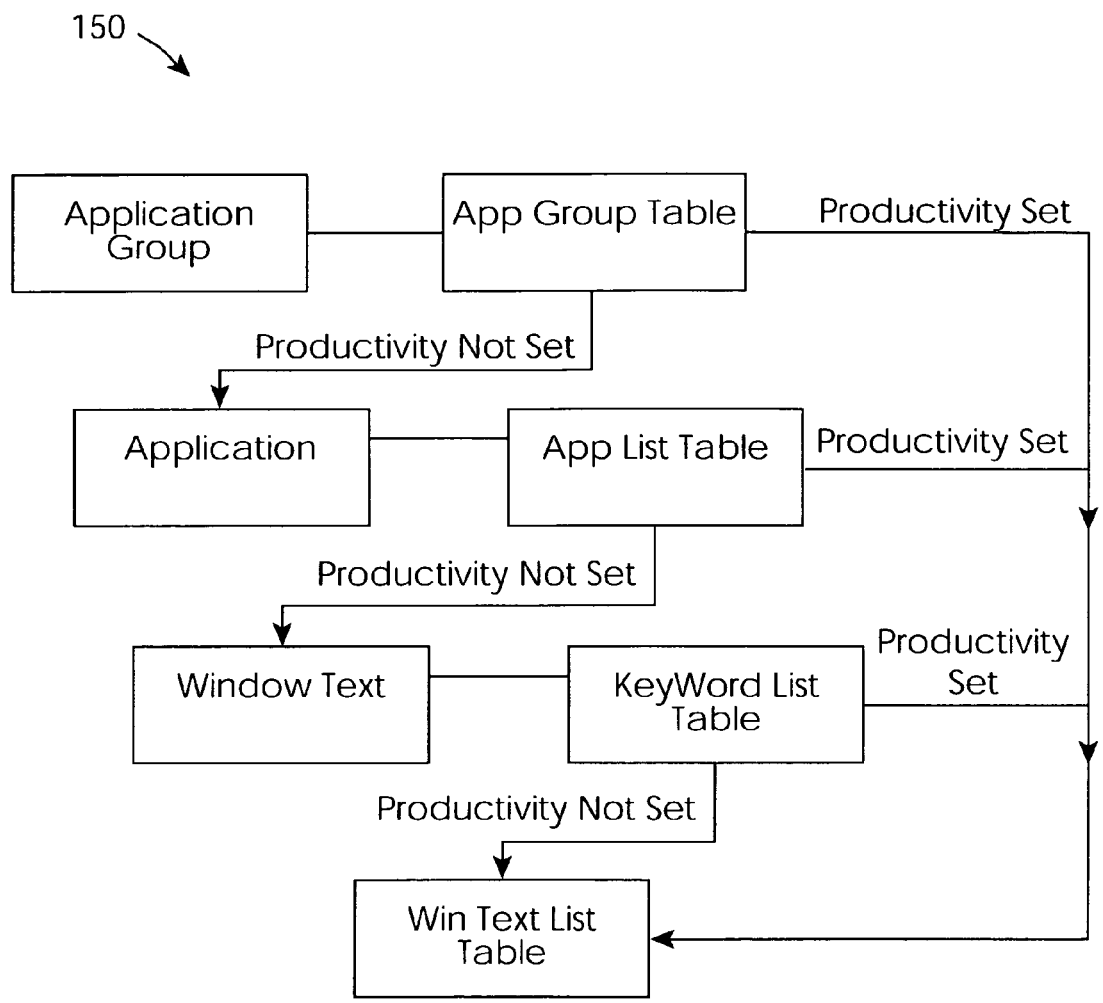
FIG. 10 is a diagram illustrating capture of productivity information.

Each logged entry within the database must be assigned a productivity rating when placed within the database. The assignment of a productivity rating is dependent on the window text contained in the log, the application of the log entry, or the group to which the application has been assigned. The productivity relationship is illustrated in FIG. 10.

If the log entry contains an application which is in a group that is marked as productive or unproductive, then the productivity score for this group is assigned to the entry for this log item. If the application group's productivity is marked as dependent on application then the productivity of the log item is set from the productivity of the application. If the productivity of the application is set to unknown, then window text of the log item is compared with a set of known keywords. Each keyword has a specified productivity rating. If no keywords match, then the productivity for this log item is set to unknown entry Background Task Logging The utility can be used to monitor all background windows on the user's PC. This is achieved using the EnumWindows™ Function to scan through all desktop windows, limiting to only visible windows using the IsWindowVisible Function and storing the records to an internal linked list. Background window information may be useful in situations such as where certain users may try to thwart the utility by keeping a productive application active as a small window in the foreground while reading a non-productive item as a larger inactive window in the background.

A live transfer mechanism may be used instead of the log file mechanism, in which the utility transmits records over a TCPIP link rather than writing to a log file. In the event that the link is unavailable records are stored to the log file and transferred when the link is re-established.

The utility also includes a triggered event mechanism to automatically execute an event based on an activity or sequence of activities performed by a user such as non-productive activity exceeding a predefined period in a particular day or alerting a user if they spend excessive time at a particular task. The utility also identifies standard profiles for users and triggers an alert when a user falls outside a predefined tolerance as identified by a standard profile.

It will be appreciated that the invention provides for capture of very comprehensive information. This information is in discrete event records, which are simple to manipulate downstream for generation of reports. The frequency of event records allows time-based reports to be generated in a simple manner. For example productivity versus time can be easily plotted from the database. Because data is captured at the periodic callback process intervals there is very little impact on operation of the computer, as opposed to the prior approach of trapping all commands.

The invention is not limited to the embodiments described, but may be varied in construction and detail.

What is claimed is:

1. A utility for monitoring usage of a computer by:
monitoring in real time for expiration of a current frame period, and:
  if the current frame period has expired, writing out current activity to a log database and creating a new entry,
  if not expired, checking if an active window title text is the same as that of a stored window title text and, if not, writing out the stored entry and creating a new entry;
in which a new entry is created by:
  checking if the name of an active window is in a stored window list, and if so, reading an application name for the window,
  if the name of the active window is not in the stored window list, scanning through all executing processes and detecting those processes created by files having an executable-indicating extension and scanning through said processes for a process identifier matching that of the active window process; and in which the utility comprises:
  a main program and a first protection program each of said programs having a protection mutex and a thread, each thread repeatedly checking the protection mutex of the other program, and
  if the mutex of the main program is absent the first protection program re-starts the main program, and if the mutex of the first protection program is absent the main program re-starts the first protection program;
and in which the utility stores a standard user activity profile and automatically executes an alert event according to comparison of user activity with a profile;
and in which the utility automatically determines a productivity classification for each used application.

2. The computer usage monitoring utility as claimed in claim 1, wherein the utility comprises means for recording an event for each application used by a user and for applying a productivity classification for each event.

3. The computer usage monitoring utility as claimed in claim 2, wherein the utility accesses a classification table in which a productivity classification is allocated to application groups, to applications, and to window text keywords.

4. The computer usage monitoring utility as claimed in claim 3, wherein the utility comprises means for attempting to classify productivity in sequence according to application group, application, and keywords.

5. The computer usage monitoring utility as claimed in claim 1, wherein the utility comprises means for checking for an active window at periodic callback intervals, and for marking an idle indicator if user activity is below a threshold.

6. The computer usage monitoring utility as claimed in claim 5, wherein the utility comprises means for generating an event record at a callback interval when either a frame time period expires or when an active application changes, whichever is earlier.

7. The computer usage monitoring utility as claimed in claim 5, wherein the utility comprises means for determining usage data according to a captured number of actions of user input devices.

8. The computer usage monitoring utility as claimed in claim 7, wherein the user input devices are a keyboard and a mouse.

9. The computer usage monitoring utility as claimed in claim 5, wherein the utility comprises means for incrementing an idle count at periodic intervals if an input device is inactive and for marking a window as idle when the count reaches a threshold.

10. The computer usage monitoring utility as claimed in claim 1, wherein the utility comprises means for capturing an active URL if the active application is a browser.

11. The computer usage monitoring utility as claimed in claim 1, wherein the utility comprises a second protection program comprising means for re-activating the main program or the first protection program if either stops operating and for terminating itself when it has finished execution.

12. The Computer usage monitoring utility as claimed in claim 1, wherein the main program comprises means for writing an alert to a log file if the first protection program is terminated.

13. The computer usage monitoring utility as claimed in claim 1, wherein the utility comprises a live transfer mechanism for automatic transfer of event records to a server in real time.

14. A computer program product wherein the product is stored on a computer readable medium, comprising software code portions for providing a utility as claimed in claim 1 when executing on a digital computer.

* * * * *